Oct. 15, 1957     A. W. JACOBSON ET AL     2,810,106
PRECISE MEASUREMENT MEANS FOR ELECTRICAL NETWORKS
Filed Nov. 16, 1950
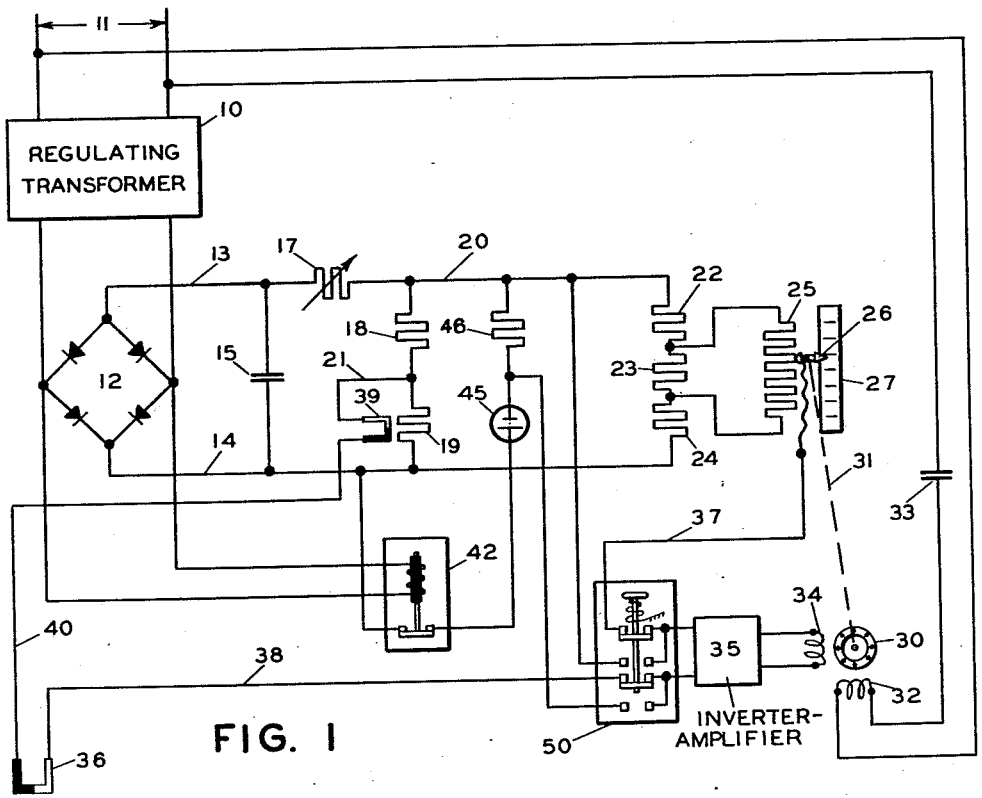
FIG. 1
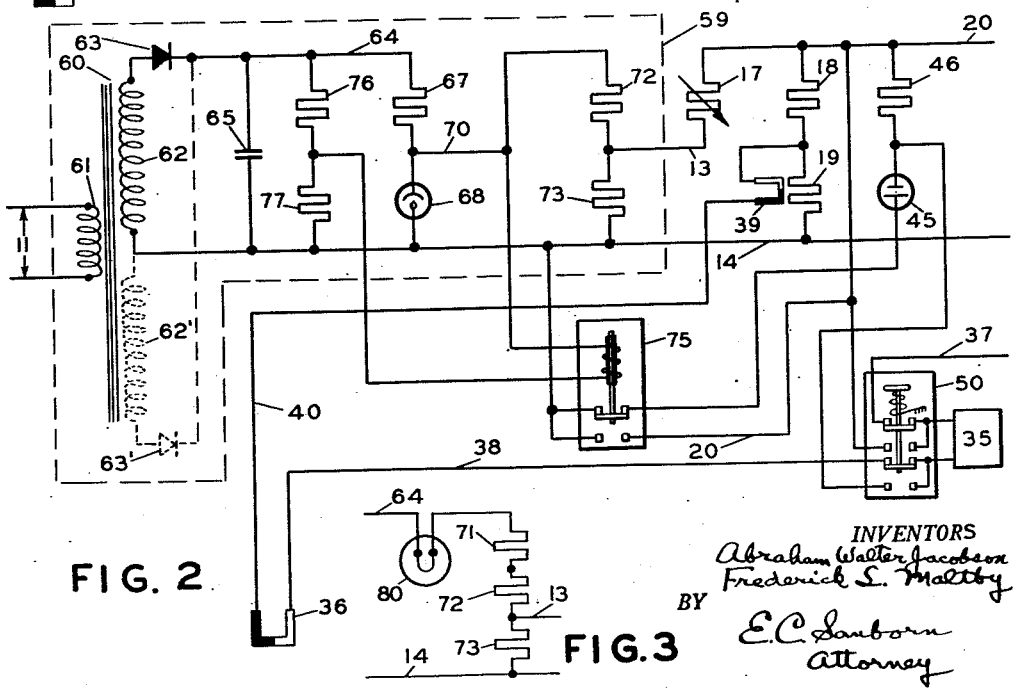
FIG. 2
FIG. 3
INVENTORS
Abraham Walter Jacobson
Frederick S. Maltby
BY
E. C. Sanborn
Attorney United States Patent Office 2,810,106
Patented Oct. 15, 1957

2,810,106

PRECISE MEASUREMENT MEANS FOR ELECTRICAL NETWORKS

Abraham Walter Jacobson, New Haven, and Frederick L. Maltby, Naugatuck, Conn., assignors to The Bristol Company, Waterbury, Conn., a corporation of Connecticut Application November 16, 1950, Serial No. 195,963

16 Claims. (Cl. 323—66)

This invention relates to electrical networks, and more especially to the establishment and maintenance of essential electrical conditions in a network for precise determination of electromotive forces derived from an external source. While it has been set forth in its special application to a balanceable system including a potentiometer for measuring such electromotive forces—specifically the electromotive force derived from a thermocouple exposed to a temperature to be measured—it will be recognized as generally applicable to electrical systems wherein it is required to maintain a predetermined and constant voltage across an impedance of fixed magnitude.

In the determination of electrical potential differences by means of a potentiometer it is essential that the voltage drop along the slide-wire (or corresponding element) of the electrical circuit be known and reproducible. This is usually accomplished by establishing in that element of the circuit a current of constant value, derived from a steady source of voltage and subject to adjustment, either manual or automatic, in order that it be maintained at that value. Standardization of the current value, and hence of the potential gradient along the potentiometer circuit, is customarily effected by the use of a standard cell, which may be connected in parallel with a selected portion of the circuit, the current in the latter then being adjusted until the potential drop thereacross is equal to the voltage of the standard cell, which condition is indicated by reduction to zero of the current in a galvanometer or equivalent detecting device included in the connection to the standard cell. Not only is the standard cell subject to appreciable voltage changes according to the current which may pass through it, but the open-circuit or zero-current potential of the cell is dependent upon its past history, rendering it necessary not only that a null or balance method of measurement be utilized when checking a potential, but that the current through the cell be drastically limited with respect to both magnitude and duration. For this reason it is customary in potentiometer circuits to provide not only a high resistance in series with the cell, but also means whereby the connection of the cell to the circuit for standardization purposes shall be made of as short time duration as practicable. While some forms of potentiometers are equipped with a null detector for the standard cell circuit quite separate from the galvanometer or equivalent which normally detects unbalance in the main circuit, it has been found expedient generally to use a common detector for both purposes, effecting the transfer of the same from one portion of the circuit to the other by means of suitable switching devices.

Conventional practices in the standardization of potentiometers are in general based on the assumption of negligible variation in the supply voltage during the intervals between checks against the standard cell. While a good battery will deliver a steady voltage over an extended operating life, and while periodic adjustment of the potentiometer current will compensate for the progressive aging of the battery, it is known that transient conditions, such as temperature variation, can superimpose on the battery characteristic relatively rapid changes which may evade the periodic checks if these are spaced over considerable intervals of time. In automatically standardized potentiometers, it is quite common to use an interval of the order of forty-five minutes between successive checkings, and the changes in battery voltage which may take place in much shorter periods than that interval are capable of introducing serious errors into the potentiometer readings. The undesirable temperature characteristic of batteries is accentuated in modern self-balancing potentiometers having an electronic detector and servomotor system, in that the heat losses in these instruments are relatively higher than those in the galvanometer-detector mechanically balanced instruments, with correspondingly higher operating temperatures and concomitantly greater temperature variations. It thus becomes desirable that standardization be effected with a higher degree of frequency than conventional practice dictates, and more often than is found practicable with either the manually or automatically standardized potentiometers of the prior art.

While great progress has been made in the development of regulating devices whereby there may be derived from a commercial power supply a current of steady value, such methods have not attained a degree of refinement commensurate with the precision required in the maintenance of a constant voltage in a potentiometer network.

A conventional and well known method of obtaining a reasonably steady voltage from a commercial source lies in the use of a regulating transformer, with a suitable rectifier, preferably of the bridge type giving full-wave rectification, supplied from its output. While a considerable number of such transformers are available, an example is fully set forth and described in U. S. Letters Patent No. 2,212,198, granted to J. G. Sola, August 26, 1940. Such a transformer, when properly used, will maintain its output voltage constant with an accuracy of the order of 1 percent for such variations of supply voltage as are met with in good commercial service, and when the output is rectified, it is found that if the direct-current terminals of the rectifier are shunted by a suitable capacitor, the D.-C. voltage will be subject to materially less variation than the A.-C. potential derived from the regulating transformer. This is apparently traceable to the fact that the transformer effects its regulation on the effective value of the voltage by changing the wave-form, while the peak value remains substantially constant. The capacitor potential being essentially subject to the peak of the applied voltage, i. e., to the amplitude rather than to the breadth, of potential waves impressed thereon, tends to attain a value corresponding to the peak of the ripples in the rectified voltage, and to obscure such variations as may take place in the form of those ripples.

While the combination of a regulating transformer and a rectifier, as described, provides a potential free from the major variations in a commercial power supply, the remaining variation is in general beyond the tolerance required for purposes of potentiometric measurement, and, since the variations are likely to be rapid and irregular in their occurrence, little or nothing would be accomplished by periodic standardization and adjustment of the potentiometer current derived from such a supply.

It will be obvious that if the current in the potentiometer circuit could at all times be maintained at its ideal value, the potential across the portion of the network selected for standardization would remain equal to that of the standard cell, when the cell current would remain of a zero value, and the cell could be left permanently connected in the circuit. The sole need for the standard cell, however, is the fact that this ideal condition is not attained in practice. While, as pointed out, the present state of the art in development of standard cells demands that the current passed through a cell be of very small magnitude, it has been found that a small current may be more or less continuously passed through such a cell without prohibitive deterioration or change in terminal voltage. Prolonged tests have shown that with certain well known commercial types of cells, a discharge of three microamperes continued over a period of one year results in a lowering of 0.15% in the open circuit terminal voltage. Furthermore, it has been found that the action of such a cell is to some extent reversible, and that a prolonged current flow in a "charging" direction tends similarly to increase the terminal voltage. These properties of the conventional standard cell have been confirmed in tests wherein such a cell left permanently connected into a network and "floating" in such a manner that a limited current may pass through the cell, sometimes in a discharging, and sometimes in a charging, sense has been found to maintain its reference potential well within practical requirements over long periods of time.

While in conventional practice it has been the custom to ultilize the small current passed through a standard cell for the purpose solely of actuating a detector whereby to designate the sense and extent of the desired adjustment in potentiometer current, it is obvious that this current itself flowing in the potentiometer network will tend to reduce the discrepancy between the actual and ideal potentials, and thereby, to correct whatever error may exist in the potentiometer current. The magnitude of this corrective influence depends upon the ratio of the potentiometer circuit resistance to that of the standard cell. If the latter resistance were zero the correction would be complete. In general, such inherent correction requires that the cell resistance be as low as possible and the potentiometer resistance as high as possible. It has been found that in a suitably proportioned potentiometer circuit, supplied with current having basic regulation to maintain its value constant within a variation of one percent or less, a standard cell "floated" on the potentiometer circuit will continuously maintain the reference potential within limits suited to industrial pyrometry and equivalent applications, and will do so without significant impairment of the constancy or accuracy of the cell over long periods of time.

It is an object of the present invention to provide means for the standardization of current in a potentiometer network without the need for periodically connecting a standard cell into the network with a detector and mechanically adjusting the value of said current until the detector indicates a condition of balance.

It is a further object to provide means of the above nature, wherein the standardization function shall be carried out continuously.

It is a further object to provide standardization means wherein the number of movable contacts in the network shall be minimized.

It is a further object to provide means of the above nature, including a "fail-safe" feature, whereby upon failure of the electric power supply or of components of the network, the system shall revert to a condition wherein the standard cell will not be damaged by excessive current flow, and wherein the potentiometer contact shall tend to assume the position least likely to introduce hazardous conditions in a magnitude subject to automatic regulation thereby.

It is a further object to provide means whereby the connections of said cell may be temporarily altered so that the current in the cell may be determined and preliminary standardization of current in the network effected by reducing said current to a zero value.

It is a further object to provide means of the above nature wherein attainment of the foregoing objects may be effected without interference with cold-end compensation when the apparatus is used for measurement of temperature as determined by a thermocouple.

It is a further object to provide means of the above nature which shall not be restricted with respect to absolute potential of the measuring network, thus allowing any selected point of said network to be grounded or operated at any other selected electrical potential.

In carrying out the purposes of the invention, it is proposed to provide in a potentiometer instrument a network having its components so correlated that a standard cell may be connected thereto for extended periods of time without deterioration, and so to leave a cell permanently connected during operation of the potentiometer as a measuring instrument.

It is further proposed to provide automatic means whereby in the event of failure of the electric power supply or of components of the network, the cell shall be cleared from the circuit, and the potentiometer revert to a "safe" condition.

Other features and advantages of the invention will be hereinafter described and claimed.

In the drawings:

Fig. 1 is a diagrammatic representation of a potentiometer incorporating the principle of the invention, and shown in its specific application to the measurement of temperature as determined by a thermocouple.

Fig. 2 is a diagram of an alternative form of circuit to which the principles of the invention may be applied.

Fig. 3 is a diagram of an alternative form of a portion of the circuit shown in Fig. 2.

Referring now to Fig. 1 of the drawings:

A regulating transformer of the class hereinbefore stated, or its equivalent, capable of providing an alternating-current output regulated to approximately one percent of accuracy over a normal operating range of supply voltage is represented by the numeral 10. The primary winding of this transformer is connected to an alternating-current source 11, and the secondary winding develops an output (which may be of the order of six volts) at its terminals, across which is connected a rectifier 12. The output (D.-C.) terminals of the rectifier are connected to two conductors 13 and 14, and between these is bridged a capacitor 15 of sufficient magnitude to bypass substantially the whole of the residual alternating component in the rectifier output.

Connected between the conductors 13 and 14 is a voltage divider comprising three resistance units 17, 18 and 19 in series. Resistors 18 and 19 have values of the order of 40,000 and 530 ohms respectively, the former being of fixed value and the latter being formed of a material having a predetermined temperature coefficient of resistivity, as hereinafter to be set forth in greater detail. The resistor 17 has a nominal value of the order of 80,000 ohms, and is made adjustable, so that with the nominal output voltage of the rectifier 12 applied between the conductors 13 and 14, the current flow through the resistors 17, 18 and 19 in series may be precisely regulated to a value where the potential across the combined resistors 18 and 19 will be of the order of 1.019 volts, corresponding to that of the conventional standard cell. The conductor between the resistors 17 and 18 is designated by the numeral 20, and that between the resistors 18 and 19 by the numeral 21.

While, without departing from the spirit of the invention, the measuring network may assume any one of a variety of forms and proportionings, the following may be taken as exemplifying a circuit well adapted to the purposes. Connected in series between the conductors 20 and 14 are three resistance units 22, 23 and 24, which may have values of the order of 25,000 ohms, 1,000 ohms, and 200 ohms, respectively, and shunted across the intermediate unit 23 is a calibrated slide-wire element 25, which may have a resistance value of the order of 1,400 ohms. The slide-wire 25 is provided with an adjustable contact 26 positionable at any point along said slide-wire, and adapted to cooperate with a graduated scale 27 in providing an indication of the position of said contact with respect to the slide-wire.

While the apparatus as thus far set forth constitutes a potentiometer adapted to the measurement of a potential existing between the adjustable contact 26 and a selected point of fixed potential within the network, it will further be described in its application to the measurement of temperature as determined by a thermocouple, and will be exemplified in a self-balancing form to which the principles of the invention are especially applicable.

A reversible two-phase motor 30 is provided with a mechanical connection 31 whereby to position the contact member 26 at any point along the slide wire 25. One phase-winding 32 of the motor 30 is connected to the alternating-current power source 11 through a capacitor 33 or other phase-shifting device, whereby to obtain optimum operation of the motor 30, and the other phase-winding 34 of the motor 30 is connected to the output terminals of a detector-amplifier 35 of the class adapted to respond to a small unidirectional input potential and to produce an alternating output voltage proportional thereto and of a phase position depending upon the polarity of said input potential. Such devices, embodying galvanometer-relay combinations, are well known in the art; but for the purpose of the present invention a preferred instrumentality is that set forth in copending application Serial No. 103,869, filed by J. L. Russell, July 9, 1949, now Patent No. 2,636,094, issued April 21, 1953.

The movable contact 26 and one terminal of a thermojunction 36 exposed to temperatures to be measured are connected by conductors 37 and 38 respectively, through switch contacts presently to be described, to the input terminals of a detector-amplifier 35.

The thermoelectric circuit is completed by means of a conductor 40 from the free terminal of the thermojunction 36 to the corresponding terminal of a thermojunction 39 (constituting the "cold junction of the system"), the free terminal of said last-named junction being connected to the conductor 21 between the resistors 18 and 19. Compensation for the temperature of the cold junction in the thermoelectric circuit may be effected in the well known manner by forming the resistor 19 of material having a suitable temperature coefficient of electrical resistivity—copper or nickel, for example—and juxtaposing the junction 39 thereto in thermal relationship, so that said resistor and junction shall tend to assume a common temperature. Thus, variations in the temperature of the cold junction 39, tending to shift the point of reference in the measuring circuit, will correspondingly vary the resistance of the element 19, thereby shifting the potential of the conductor 21 with respect to the potentiometer network. By proper selection of the resistor 19 with respect to the junction 39, there may thus be effected a substantial compensation for ambient temperature changes over a wide range of operation.

A relay 42 having normally open contacts is arranged to be energized concurrently with energization of the potentiometer network, and for this purpose may have its actuating winding connected to the output terminals of the transformer 10, as shown, or alternatively to the input terminals thereof. As a further alternative, said winding may be connected between the conductors 13 and 14, representing the direct-current supply. These alternatives are recognized as common practice, and need not here be further discussed. A standard cell 45 has one of its terminals connected in series with a resistor 46, having a value of the order of 20 ohms, to the conductor 20, and its other terminal through the contacts of the relay 42 to the conductor 14. Thus, when the relay 42 is energized, the standard cell will be connected between the conductors 20 and 14 in series with the resistor 46, and when the relay is de-energized the cell will be open-circuited and freed from the possibility of current drain. It will be understood that when the standard cell is connected to the conductors 14 and 20 it opposes the regulated supply voltage applied from the transformer 10 and rectifier 12 across said conductors.

A manually actuated spring-opposed contactor 50 is connected to function as a double-pole double-throw switch, the contacts which are common to both positions of the switch being connected to the input terminals of the detector-amplifier 35. The normally-closed free contacts are connected to the conductors 37 and 38 respectively, so that in the normal position of the switch, said conductors lead directly to the input terminals of the detector-amplifier. The normally open free contacts of the contactor 50 are respectively connected to the conductor 20 and to the point between the resistor 46 and the cell 45, so that, when the contactor is manually actuated in opposition to the influence of the spring, the detector-amplifier is cleared from the thermocouple circuit and connected with its input terminals across the resistor 46.

Operation of the apparatus as described is as follows: With the system energized from the alternating-current source 11, there will appear between the conductors 13 and 14 a unidirectional potential initially regulated by the action of the regulating transformer 10 and rectified and further regulated by the rectifier 12 in combination with the capacitor 15. The alternating component being eliminated by the capacitor 15, the remaining potential will be substantially direct current of sufficient smoothness for the purposes of measurement. This potential will be impressed upon the resistors 18 and 19 in series, and also upon the resistors 22, 23 and 24 in series. If there be no potential set up in the loop including the thermojunctions 36 and 39, the voltage impressed upon the input terminals of the amplifier 35 will represent the difference in potential between the conductor 21 and the sliding contact 26, and, according to principles well known in the art, and forming no part of the present invention, the balancing motor 30 will be operated to position said contact along the slide-wire 25 until that potential attains a zero value, which corresponds to the zero of measurement of the system. Suitable selection and initial adjustment of the resistors 22, 23 and 24, according to well known principles, enable the zero point to be suitably located with respect to the scale 27, and the potentiometer to be given the desired sensitivity of measurement. The relay 42 being energized, the standard cell 45 will be connected between the conductors 20 and 14 in series with the resistor 46, and, assuming at first that the potential between said conductors has been made equal to that of the standard cell, no current will flow through the cell or through the resistor 46 in series therewith. If the potential between the conductors 20 and 14 should vary from that established by the cell, there will be a corresponding current flow through the cell in series with the resistor 46, which, according to the principles hereinbefore set forth, will tend to stabilize said potential and maintain it within the required limits. The regulatory influence of the standard cell permanently connected in the potentiometer circuit as set forth may be determined by the following simple computation: With resistances of the several components of the network as previously stated, the total resistance as measured between the conductors 20 and 14 will be of the order of 15,800 ohms. With the standard cell in circuit and the potentiometer voltage adjusted to a condition of balance, the current through the branch including the cell will of course be of zero magnitude. Assume, now, that in the voltage of the supply source there occurs a deviation such that the current therefrom flowing in the potentiometer circuit is reduced 1 percent in magnitude, the potential developed within the standard cell remaining unchanged in value. The unbalanced potential in the network will then be of the order of 0.01 volt. While the resistance of the network, excluding the branch in which the standard cell is located, will be of the order of 15,800 ohms, that of the branch including the cell and the resistor 46 in series will approximate 520 ohms. In other words, about $\frac{1}{30}$ of the total drop due to current drawn from the standard cell will take place in said branch. Thus a change of 1 percent in the applied voltage will be reflected in a corresponding change of 0.03 percent in the potentiometer voltage.

It will be noted from the foregoing illustrative example of our invention that the resistance of the circuit branch which includes the standard cell is low in comparison with the resistance of the load. This is important in that it enables substantially the full voltage of said cell to be continuously impressed upon the load terminals. In addition, it will be observed that the ratio of the resistance between the load and the branch circuit containing the standard cell is of the same order of magnitude as the ratio between the expected range of voltage variation of the power supply source and the permissible deviation of the potentiometer voltage.

Under the conditions set forth, the current flowing through the standard cell will be of the order of 0.65 microamperes. On the basis of the hereinbefore cited tests, this current value, if drained continuously from the cell for a period of five years, might be expected to lower the open-circuit voltage thereof by a matter of 0.15 percent. Since, by the combination of a regulating transformer and a rectifier it has been found practicable to obtain a continuous regulation of the order of ±0.3% on the potentiometer terminals, with the alternating current supply voltage varying between 95 and 135 volts, it will be seen that the depreciation of a standard cell resulting from its being permanently connected in a circuit as hereinbefore set forth is reduced to a negligible value. Thus, with the arrangement set forth, it is possible to obtain, even under unfavorable operating conditions, a regulation of potentiometer voltage well within the standard tolerances for open circuit potential of standard cells.

With the potential between the conductors 20 and 14, and therefore across the voltage-dividing group of resistors 22, 23, 24, and 25, maintained at a standard value, the potentiometer circuit becomes available for the purposes of measurement, and any potential introduced between the conductor 21 and the sliding contact 26, will be measured, and its value exhibited on the scale 27. Thus, with the thermojunction 36 exposed to a temperature to be determined, and the temperature-sensitive resistor 19 maintained at the same temperature as the "cold junction" 39, and thereby adjusting the potential of reference to a value to compensate for said last-named temperature, the reading on the scale 27 will be a measure of the temperature of the thermojunction 36. It will be observed, moreover, that since the measuring circuit is inherently isolated from ground and from any conductive coupling with the main power supply, it may, within the limits of possible electrostatic influences, be operated at any desired electric potential. Thus, a ground connection, accidental or intentional, in the measuring circuit, such, for example, as a grounded thermocouple, will have no adverse effect on the measurement.

Preliminary, and, if desired, periodic, checking of the slide-wire potential may be effected by depressing the contactor 50, whereby the input terminals of the detector-amplifier 35 will be cleared from the "error signal" and will be connected directly across the resistor 46. If the potential between the conductors 20 and 14 differs from that of the cell, a current will flow in the resistor 46 which is in series with the cell, and the potential drop across that resistor will be impressed upon the amplifier, causing the motor 30 to be operated in a direction depending upon whether the potentiometer voltage is above or below that of the standard cell. Correction of this condition, and standardization of the slide-wire potential, is effected by manipulation of the adjustable resistor 17 until the motor, by assuming a condition of rest, indicates that the potential discrepancy has been reduced to zero and the desired standardization accomplished.

So long as the voltage between the conductors 20 and 14 is maintained at a value within a few percent of that of the standard cell, the current flow through the latter, while sufficient to compensate for minor variations and establish a standard potential across the slide-wire 25, will not be of sufficient magnitude to injure the cell, and such conditions may be continued indefinitely. If, however, the current supply 11 should be disconnected, or the supply or any of the components of the regulator should fail, the standard cell, if left connected to the circuit would tend to feed current through the network. This current drain would be in excess of that which the cell can tolerate, and in a short time it would lose its value as a standard of potential. Connection of the standard cell 45 to the conductor 14 is, however, maintained through the contact of relay 42 which is closed only when that relay is energized. Since any failure of power to the potentiometer circuit as stated would result in de-energization of the relay 42, it follows that in the event of such a failure, the standard cell circuit will be opened, and the cell relieved of any current drain until such time as the potentiometer voltage is restored, with concomitant re-energization of the relay 42.

Adaptation of the principles of the invention to use with a potentiometer system having a regulated power supply alternative to that shown in Fig. 1 is illustrated in Fig. 2. Said power supply is indicated generally by the portion of the diagram enclosed by dash lines and designated by the numeral 59.

All elements external to the power supply 59 (with exception of relay means presently to be described) are identical with the correspondingly numbered elements shown in Fig. 1. A transformer 60 having a primary winding 61 adapted to be energized from the alternating-current source 11, is provided with a secondary winding 62 which is connected in series with a rectifying unit 63 between the conductor 14 and a conductor 64, whereby to provide between said conductors a unidirectional potential of the order of 200 volts. Between the conductors 14 and 64 is connected a capacitor 65 of sufficient magnitude to bypass substantially the whole of the alternating component of the rectified potential. If full-wave, rather than half-wave, rectification is desired, the transformer 60 may be provided with a further secondary winding 62', having one terminal connected to the conductor 14 and the other, through a rectifying diode 63' to the conductor 64.

Between the conductors 64 and 14 is connected a voltage dividing series combination of three fixed-value resistance units 67, 72 and 73, these having, for example, values of the order of 8,000 ohms, 13,000 ohms and 2,000 ohms, respectively. A conductor 70 provides a tap point between the resistors 67 and 72; and between the resistors 72 and 73 is connected the conductor 13. Between the tap 70 and the conductor 14 is connected a non-linear resistor 68 having a negative voltage characteristic. While not so restricted, said non-linear resistor may expediently be embodied in a gaseous discharge regulator tube of the class commercially known as "VR-75," the designating numeral signifying that through a considerable current range in the tube the inter-electrode potential will be maintained substantially constant at a value of the order of 75 volts.

It will be noted that, whereas in the arrangement shown in Fig. 1 the potential between the conductors 13 and 14 is of the order of 6 volts, the corresponding potential which will be obtained with the arrangement shown in Fig. 2 is of the order of 12 volts. The actual, or the relative, value of these potentials is not in general of great significance, each being best suited to the type of regulator employed. Final adjustment of the potentiometer voltage to its correct value is effected by means of the resistor 17, and this may be selected to be of a suitable order of magnitude, as dictated by dominating circuit conditions.

Operation of the system shown in Fig. 2, and as thus far set forth, is identical with that of the system shown in Fig. 1. The regulating tube maintains its terminal voltage at a predetermined value within a range of 1 percent, through a wide range of supply voltage variation; and, since said tube is connected directly across the terminals of the voltage divider comprising the resistors 72 and 73 in series, its characteristic regulation will apply to each and every component of said divider, unaffected by the value of current which may be passing through the circuit branch which contains said regulating tube. According to the principles hereinbefore set forth, the standard cell 45, floating on the potentiometer network, exerts a stabilizing influence sufficient to maintain the potentiometer voltage within sufficiently close limits to permit utilization of the circuit for the purposes of measurement.

The peculiar nature of the circuit shown in Fig. 2 renders it desirable that the protective function provided by the relay 42 in Fig. 1 be supplemented by a "fail-safe" feature inherent to the circuit of Fig. 1, but not necessarily characterizing the performance of that of Fig. 2. As previously pointed out, the basic function of the relay 42 in Fig. 1 is to disconnect the standard cell from the circuit in the event of failure of the power supply. Since such failure would result in reduction of the potentiometer voltage to a zero value, the balancing mechanism, if still operative, would tend to carry the sliding contact 26 and associated elements toward the upper part of the scale, which, when automatic control of temperature is involved, is generally considered as a "safe" performance. Thus the relay 42 in Fig. 1 need have no other function than to disconnect the standard cell from the network and prevent the undesirable current drain which would otherwise take place upon disappearance of the potentiometer voltage.

In the system shown in Fig. 2, is is desirable that the standard cell be disconnected from the circuit not only in the event of failure of the power supply, but in case the regulating tube should fail, whereby an abnormal "charging" current might be caused to pass through the cell. Also, if the regulating tube should fail to ignite, or for some other reason acquire an open-circuit characteristic, it is important to prevent the potentiometer voltage from rising to an abnormal value and introducing a hazardous condition in such apparatus as may be subject to regulation from the balancing mechanism.

The relay 42 of Fig. 1 is accordingly replaced by a relay 75 provided with a set of normally open and a set of normally closed contacts. Between the conductors 64 and 14 are connected in series two resistors 76 and 77, having a value of, for example, 8,000 and 15,000 ohms respectively. (The absolute values of these resistors are not important, but their ratio must be the same as that of the register 67 to the sum of the units 72 and 73, in this case 8/15.) To the junction point between the resistors 76 and 77 is connected one terminal of the actuating winding of the relay 75, and the other terminal of said winding is connected to the conductor 70. The contacts of the relay are interconnected to function as a single-pole double-throw switch, the common point of which is connected to the conductor 14. The normally closed free contact of the relay is connected to the conductor 20, and the normally open contact to the free terminal of the standard cell 45 in a manner identical with the contacts of relay 42 in Fig. 1.

The ratio between the resistors 76 and 77 being made the same as that between the unit 67 and the series combination of units 72 and 73, the branches including these two sets of resistors comprises a bridge network, balanced unless current is flowing in the regulating tube 68, so that a potential between the conductors 64 and 14 will produce no potential between the conductor 70 and the junction point of units 76 and 77. Under such conditions the relay 75 will not be energized. Thus, with the network energized, should the potential not rise sufficiently to ignite the tube 68, or should the tube for any other reason fail to function, or should it become extinguished while operating, the relay 75 will be de-energized. This will disconnect the standard cell from the circuit, and at the same time, through the normally closed contacts of the relay, the potentiometer will be short-circuited, whereby the slide-wire contact will tend to assume the "safe" position represented by the upper extremity of the scale.

The measuring circuit of Fig. 2 is comprised of the several components of which the conductors 13 and 14 form the terminals; and comparison of the values of these components with those of the bridge network elements will make it apparent that such minor changes as may take place in the over-all resistance of the measuring circuit under operating conditions (as, for example, changes due to adjustment of the resistor 17) will have no significant effect on the balance or unbalance conditions of the bridge in so far as involves energization or de-energization of the relay 75.

It will be observed that the circuit of Fig. 2, like that of Fig. 1, being inherently isolated from ground and from connection with the power supply, may be grounded at any single point, or may be operated at any desired absolute potential within reasonable limits without adversely affecting the function of measurement.

While in Fig. 2 the basic regulation of the power supply is shown as being effected by means of a gaseous discharge tube having a negative voltage/resistance characteristic shunted across the load whose terminal voltage is to be maintained constant, it will be apparent that an equivalent effect may be obtained by a non-linear element having a positive voltage/resistance characteristic placed in series with the load. Such an arrangement is shown in Fig. 3, wherein the fixed resistor 67 of Fig. 2 is replaced by a ballast lamp 80. This element is characterized by a high positive temperature coefficient of resistivity, and therefore tends to increase its resistance with current flow, thus tending to exhibit a non-linear law wherein the variation of current is substantially less than that of the applied voltage. Consequently, the variation of voltage upon the constant resistance of the load circuit will be correspondingly less than that impressed upon the combination of the load and the ballast in series. While, in the interest of simplicity, such a further combination has not been shown, it will be obvious that the regulating tube of Fig. 2 and the ballast lamp of Fig. 3 (or components having equivalent characteristics) may be used at the same time in a single network, thus combining their regulatory influences upon the load whose terminal potential it is desired to maintain at a constant value.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In an electrical network for measuring a potential by opposing to the same an adjustable and known potential; a power source for said network including a pair of conductors and means for maintaining a potential between the same, a first branch circuit connected between said conductors and including a potentiometer for adjusting said known potential to measure the first-mentioned potential, a second branch circuit across said conductors continuously connected therebetween and untapped during normal operation of said network for measuring purposes and including means for continuously regulating said known potential simultaneously as said first-mentioned potential is opposed thereto and comprising a source of standard electromotive force connected to provide in said potentiometer a current additional to that supplied by said power source and of a magnitude to modify the potential between said conductors to compensate for the departure of said potential from a predetermined constant value.

2. In an electrical network for measuring a potential by opposing to the same an adjustable and known potential; a power source for said network including a pair of conductors and means for maintaining a potential between the same, a first branch circuit connected between said conductors and including a potentiometer for adjusting said known potential to measure the first-mentioned potential, a second branch circuit continuously connected between said conductors during normal operation of said network and including means for continuously regulating said known potential simultaneously as said first-mentioned potential is opposed thereto and comprising a source of standard electromotive force, the resistance of said second branch being low in comparison with that of said first branch whereby substantially the full voltage of said standard source will be impressed between said conductors under all operating conditions to provide in said potentiometer a current additional to that supplied by said power source and of magnitude to modify the potential between said conductors to compensate for the departure thereof from a predetermined constant value.

3. In an electrical network for measuring a potential by opposing to the same an adjustable and known potential; a power source for said network including a pair of conductors and means for maintaining a potential between the same, a first branch circuit connected between said conductors and including a potentiometer for adjusting said known potential to measure the first-mentioned potential, a second branch circuit continuously connected between said conductors during normal operation of said network and including means for continuously regulating said known potential simultaneously as said first-mentioned potential is opposed thereto and comprising a source of standard electromotive force, the resistance of said second branch being low in comparison with that of said first branch whereby substantially the full voltage of said standard source will be impressed between said conductors under all operating conditions to provide in said potentiometer a current additional to that supplied by said power source and of a magnitude to modify the potential between said conductors to compensate for the departure thereof from a predetermined constant value, and relay means energized concurrently with said power source and adapted to open the circuit of said standard source in the event of failure of said power source.

4. Means for continuously regulating to a predetermined constant value the voltage across the terminals of an electrical load supplied from a power source having a voltage higher than that which it is desired to maintain, said means including resistance means having a non-linear component in circuit between said source and load to reduce the voltage across said load to a magnitude approximating the desired value and having less variation than that of said source, and means comprising a branch circuit connected across the terminals of said load and including a source of standard electromotive force connected in said circuit to provide in said load a current additional to that derived from said power source and of magnitude to compensate for the departure of said load voltage from said desired value.

5. In an electrical network for measuring a potential by opposing to the same an adjustable and known potential and having means for continuously applying the difference of said potentials to a detecting device and adjusting said latter potential until said difference is zero; a power source for said network including a pair of conductors and means for maintaining a potential between the same, a first branch circuit connected between said conductors and including a potentiometer for adjusting said known potential to measure the first-mentioned potential, a second branch circuit continuously connected between said conductors during normal operation of said network and including means for continuously regulating said known potential simultaneously as said first-mentioned potential is opposed thereto and comprising a source of standard electromotive force, the resistance of said second branch being low in comparison with that of said first branch whereby substantially the full voltage of said standard source will be impressed between said conductors under all operating conditions to provide in said potentiometer a current additional to that supplied by said power source and of magnitude to modify the potential between said conductors to compensate for the departure thereof from a predetermined constant value, together with a circuit controlling means operable at will and adapted to apply temporarily to said detecting device a potential due to current flow in the branch including said standard source instead of said potential difference, and means for adjusting said network to reduce to zero the value of said temporarily applied potential.

6. Means for continuously regulating to a predetermined constant value the voltage across the terminals of an electrical load supplied from a power source having a voltage higher than that which it is desired to maintain, said means including a voltage divider connected to said source and in circuit with said load to reduce the potential thereacross from that of said source, a voltage-regulating non-linear resistor connected in parallel with a portion of said voltage divider, and a branch circuit connected across the terminals of said load and including a source of standard electromotive force connected to provide in said load a current additional to that derived from said power source and of magnitude to compensate for the departure of said load voltage from said desired value.

7. Means for continuously regulating to a predetermined constant value the voltage across the terminals of an electrical load supplied from a power source having a voltage higher than that which it is desired to maintain, said means including a voltage divider connected to said source and in circuit with said load to reduce the potential thereacross from that of said source, a voltage-regulating non-linear resistor connected in parallel with a portion of said voltage divider, and a branch circuit connected across the terminals of said load and including a source of standard electromotive force connected to provide in said load a current in addition to that derived from said power source and of magnitude to compensate for the departure of said load voltage from said desired value, and relay means energized concurrently with said power source and adapted to open the circuit of said standard source in the event of failure of said power source.

8. Means for regulating to a predetermined constant value the voltage impressed upon the terminals of an electrical circuit and derived from a source having a voltage higher than that which it is desired to maintain, said means including resistor means connected to said source and being divided by a tap into two sections of substantially fixed resistance ratio, one of said sections including said circuit, whereby the voltage between said terminals will be reduced to a value less than that of said source, a further voltage divider across said source and comprising two portions with an intermediate tap and having a mutual ratio similar to that between the sections of said first-named voltage divider, said voltage dividers in combination comprising a bridge network wherein when said source is energized a zero potential may exist between said respective taps, a voltage-regulating impedance connected in parallel with a section of said first-named voltage divider and when operative serving to unbalance the bridge network, a branch circuit connected to said terminals and including a source of standard electromotive force connected, to provide in the first-mentioned electrical circuit a current in addition to that derived from said source and of magnitude to compensate for the departure of the voltage between said terminals from said desired voltage, and relay means connected for energization by the potential between said taps and adapted when de-energized to open the circuit of said standard source.

9. Means for regulating to a predetermined constant value the voltage impressed upon the terminals of an electrical circuit and derived from a source having a voltage higher than that which it is desired to maintain, said means including resistor means connected to said source and being divided by a tap into two sections of substantially fixed resistance ratio, one of said sections including said circuit, whereby the voltage between said terminals will be reduced to a value less than that of said source, a further voltage divider across said source and comprising two portions with an intermediate tap and having a mutual ratio similar to that between the sections of said first-named voltage divider, said voltage dividers in combination comprising a bridge network wherein when said source is energized a zero potential may exist between said respective taps, a voltage-regulating impedance connected in parallel with a section of said first-named voltage divider and when operative serving to unbalance the bridge network, a branch circuit connected to said terminals and including a source of standard electromotive force connected to provide in the first-mentioned electrical circuit a current in addition to that derived from said source and of magnitude to compensate for the departure of the voltage between said terminals from said desired voltage, and relay means connected for energization by the potential between said taps and adapted when de-energized to open the circuit of said standard source and to provide a shunt between said terminals.

10. Means for continuously regulating to a predetermined constant value the voltage across the terminals of an electrical load supplied from a power source having a voltage higher than that which it is desired to maintain, said means including a voltage divider connected to said source and in circuit with said load to reduce the potential thereacross from that of said source, a voltage-regulating non-linear resistor having a negative voltage-resistance characteristic and connected in parallel with a portion of said voltage divider, and a branch circuit connected across the terminals of said load and including a source of standard electromotive force connected to provide in said load a current in addition to that derived from said power source and of magnitude to compensate for the departure of said load voltage from said desired value.

11. Means for continuously regulating to a predetermined constant value the voltage across the terminals of an electrical load supplied from a power source having a voltage higher than that which it is desired to maintain, said means including a voltage divider connected to said source and in circuit with said load to reduce the potential thereacross from that of said source, a voltage-regulating non-linear resistor having a positive voltage-resistance characteristic and connected in series with said load, and a branch circuit connected across the terminals of said load and including a source of standard electromotive force connected to provide in said load a current in addition to that derived from said power source and of magnitude to compensate for the departure of said load voltage from said desired value.

12. In an electrical network for measuring a potential by opposing to the same an adjustable and known potential; a power source for said network including a pair of conductors together with a regulating transformer, a rectifier, and a capacitor in parallel with said rectifier, for maintaining a potential between said conductors, a branch circuit connected between said conductors and including a potentiometer for adjusting said known potential to measure the first-mentioned potential, and another branch circuit across said conductors continuously connected therebetween and untapped during normal operation of said network for measuring purposes and including means for continuously regulating said known potential simultaneously as said first mentioned potential is opposed thereto and comprising a source of standard electromotive force connected to provide in said potentiometer a current additional to that supplied by said power source and of a magnitude to modify the potential between said conductors to compensate for the departure of said potential from a predetermined value.

13. In an electrical network for measuring a potential by opposing to the same an adjustable and known potential; a power source for said network including a pair of conductors and means comprising a resistor having a negative voltage-resistance characteristic for maintaining a potential between said conductors, a branch circuit connected between said conductors and including a potentiometer for adjusting said known potential to measure the first-mentioned potential, and another branch circuit across said conductors continuously connected therebetween and untapped during normal operation of said network for measuring purposes and including means for continuously regulating said known potential simultaneously as said first mentioned potential is opposed thereto and comprising a source of standard electromotive force connected to provide in said potentiometer a current additional to that supplied by said power source and of a magnitude to modify the potential between said conductors to compensate for the departure of said potential from a predetermined value.

14. In an electrical network for measuring a potential by opposing to the same an adjustable and known potential; a power source for said network including a pair of conductors and means comprising a resistor having a positive voltage-resistance characteristic connected in series with said network for maintaining a potential between said conductors, a branch circuit connected between said conductors and including a potentiometer for adjusting said known potential to measure the first-mentioned potential, and another branch circuit across said conductors continuously connected therebetween and untapped during normal operation of said network for measuring purposes and including means for continuously regulating said known potential simultaneously as said first mentioned potential is opposed thereto and comprising a source of standard electromotive force to provide in said potentiometer a current additional to that supplied by said power source and of a magnitude to modify the potential between said conductors to compensate for the departure of said potential from a predetermined value.

15. Apparatus according to claim 1 wherein said means for maintaining a potential between said pair of conductors comprises voltage-dividing means having two portions one of which possesses a negative voltage-resistance characteristic, and said pair of conductors being connected across said one portion of said voltage-dividing means.

16. Apparatus according to claim 1 wherein said means for maintaining a potential between said pair of conductors comprises voltage-dividing means having two portions one of which possesses a positive voltage-resistance characteristic, and said pair of conductors being connected across the other portion of said voltage-dividing means.

References Cited in the file of this patent

UNITED STATES PATENTS

| | | |
|---|---|---|
| 854,121 | Storer | May 21, 1907 |
| 2,019,352 | Livingston | Oct. 29, 1935 |
| 2,368,912 | Barnes | Feb. 6, 1945 |
| 2,404,891 | Schmitt | July 30, 1946 |
| 2,468,778 | MacKenzie | Apr. 26, 1949 |
| 2,469,569 | Ohl | May 10, 1949 |
| 2,508,029 | Kannenberg | May 16, 1950 |
| 2,536,245 | Wills | Jan. 2, 1951 |
| 2,563,179 | Malsbary | Aug. 7, 1951 |

FOREIGN PATENTS

| | | |
|---|---|---|
| 24,457 | Great Britain | Oct. 21, 1910 |